Patented May 3, 1938

2,115,843

UNITED STATES PATENT OFFICE 2,115,843

SULPHONIC ACIDS FROM SO$_2$ EXTRACT OF LIGHT MINERAL OIL DISTILLATES

Oliver H. Dawson, Baytown, Tex., assignor to Standard Oil Development Company, a corporation of Delaware No Drawing. Application October 19, 1934, Serial No. 749,046

7 Claims. (Cl. 196—4)

This invention relates to improvements in compositions for use in breaking water-oil emulsions.

It has been customary in preparing a compound for use in breaking oil and water emulsions to treat lubricating oil having a viscosity of 570 at 100° F. with batches of strong sulphuric acid. The sludge resulting from this treatment has been washed with water and agitated with steam after which the unused free sulphuric acid has been drawn off from the sludge. The sludge was washed with water until almost free from sulphuric acid. The resulting sludge product had the property of breaking oil and water emulsions. However, it contained asphalts and other material that impaired its property of breaking oil and water emulsions. The sludge was too viscous to be used without being diluted with water and was highly viscous even though diluted with water.

It is an object of this invention to produce a substantially non-viscous compound for use in breaking emulsions composed of oil and water. Another object is to provide a composition having increased efficiency in breaking oil and water emulsions.

According to my invention, the base material for preparing my emulsion breaking composition comprises any highly aromatic compound which is a by-product of crude oil. Highly aromatic distillates such as cycle stock from petroleum cracking units can be used. Sulphur dioxide extracts of light mineral oil distillates are preferred. The base material can be the Edeleanu extract obtained in SO$_2$ treating kerosene. This SO$_2$ extract has a relatively low average molecular weight. The extract can be that portion of a kerosene distillate soluble in sulphur dioxide at a temperature of 10 to 20° F. The base materials are highly unsaturated and highly aromatic and react readily with sulphuric acid to give large yields of the sludge. The materials are light compounds which yield a sludge which is relatively non-viscous with sulphuric acid.

In one manner of carrying out the invention the base material such as sulphur dioxide extract of light mineral oil distillate is washed with dilute caustic soda to remove the naphthenic acids and any other acidic compounds which may be present. The washed extract is given two successive treats of fuming or 98% sulphuric acid in the proportion of approximately 12 pounds of acid per barrel of extract. The extract and sulphuric acid are mixed by air blowing, or by a stirring device or the like. The sludges from these two preliminary treats with sulphuric acid are not completely soluble in water, showing that compounds other than sulphonic acids are present. These sludges contain asphalts and other material. These sludges are therefore discarded.

The settled extract from the above treatment is now sulphonated by treatment with fuming or 98% sulphuric acid. The acid is added in successive batches corresponding to approximately 50 pounds of sulphuric acid per barrel of extract. The amount of acid added in each batch is limited so as to prevent a rise in temperature of more than approximately 40° F. with each successive treat. Preferably the extract is allowed to cool somewhat between each treat with sulphuric acid so that the final temperature of the extract does not rise substantially above 150° F. The extract can be treated with a number of successive batches of sulphuric acid as desired until all or practically all of the extract is sulphonated.

The sludges obtained from each treat contain sulphonic acids and unreacted sulphuric acid together with traces of unreacted extract mechanically carried down with the sludges. The strong sulphuric acid, especially fuming acid, reacts readily with the extract from kerosene due to its composition, giving large yields of sludge containing large quantities of sulphonic acids. Very little unreacted sulphuric acid remains and most of this is washed out with the water. These sludges are operative to break oil and water emulsions. As a further refinement some of the unreacted sulphuric acid is removed by agitating the sludge with steam after the addition of approximately 20% of water. The dilute sulphuric acid settles and is withdrawn from the sludge. The sludge is steamed in the presence of water to remove additional sulphuric acid.

By way of specific example, Edeleanu extract obtained in sulphur dioxide treating kerosene is subjected to two successive treats with fuming sulphuric acid in the proportions of 12½ pounds of sulphuric acid per barrel of extract at temperatures of 80 to 100° F. This treatment resulted in an extract loss of 3.7%. The sludge resulting from this treatment was discarded. The thus treated extract was successively sulphonated with three batches of fuming sulphuric acid at temperatures of 80 to 120° F. Of the three treats, the first resulted in an extract loss of 16.2% and the formation of sulphonic acid sludge of 20% by volume. The second treat resulted in an extract loss of 17.5% by volume and the formation of a sulphonic acid sludge amounting to 21.8% by volume. The third treat resulted in an extract loss of 15.9% by volume and the formation of a sulphonic acid sludge amounting to 20.2% by volume. The three sludges when combined and steamed after adding 20% by volume of water yielded an 11% dilute sulphuric acid separation. The combined sludge contained 79.5% total solids after drying. It had a molecular weight of solids of 185. The wet sludge had a sulphonic acid content of approximately 65% by volume.

The sludge obtained as above described is purple in color by transmitted light and black in color by reflected light. It flows at temperatures as low as 32° F. and is of the viscosity of heavy motor oil at room temperature. The total solids obtained by drying the sludge under vacuum at a temperature of 212° F. ranges from 60 to 80% by weight, depending upon the amount of water left in the sludge during the extraction of sulphuric acid. The molecular weight of the solid material is approximately 185. The sludge is substantially non-viscous and can be used for shipment for use in breaking oil and water emulsions without being diluted with water. The sludge can therefore be kept at a minimum volume of weight. A minimum of oil is left in the sludge due to the low viscosity of the sludge which permits the oil to rise readily from the sludge during the sulphonation process.

The sludge so obtained can be used to break emulsions of oil and water. To the emulsion to be treated there is added a sludge using a proportion of approximately one part of sludge to 5,000 parts of emulsion. The precise character of the oil emulsion will determine the best proportion to be used, very refractory emulsions requiring, of course, more of the sludge. Preferably the emulsion has been maintained at approximately atmospheric temperature or higher during the treatment with the sludge. Some emulsions require a temperature as high as 180° F. before separating the oil and water.

If desired, the acid sludge can be treated with a slight excess of ammonia to yield alkaline compounds which may be more effective than the acid sludge in breaking crude oil emulsions from some fields.

In the appended claims I have used the term strong sulphuric acid as generic to all concentrations of sulphuric acid including fuming acid which will react with the sulphur dioxide extract of light mineral oil distillates to produce a sludge.

Various changes may be made within the scope of the appended claims in which it is desired to claim all novelty inherent in the invention as broadly as the prior art permits.

I claim:

1. The method of preparing an oil emulsion breaking compound, which comprises washing with alkaline material highly aromatic distillate obtained by the sulphur dioxide extraction of kerosene, treating the washed distillate with batches of strong sulphuric acid whereby batches of sludge are formed, discarding the first batch of sludge, combining the other batches of sludge, and removing free sulphuric acid from the combined batches of sludge.

2. A low viscosity compound for use in breaking emulsions comprising a water soluble sulphonated highly aromatic petroleum oil prepared from a sulphur dioxide extract of a highly aromatic mineral oil distillate, which extract has been treated with alkaline material to remove the naphthenic acids.

3. A low viscosity compound for use in breaking emulsions comprising a sulphonated highly aromatic distillate prepared from a sulphur dioxide extract of highly aromatic mineral oil distillate, which extract has been treated with alkaline material to remove naphthenic acids, followed by treatment with batches of strong sulphuric acid whereby batches of sludge are formed, the first batch of sludge being discarded.

4. A low viscosity compound for use in breaking emulsions comprising a sulphonated highly aromatic petroleum oil prepared from a sulphur dioxide extract of kerosene, which extract has been treated with alkaline material to remove the naphthenic acids.

5. The method of preparing an oil emulsion breaking compound which comprises washing with alkaline material a highly aromatic distillate obtained by the sulphur dioxide extract of light mineral oil distillate, treating the extract with alkaline material to remove the naphthenic acids, and treating the washed distillate with batches of strong sulphuric acid whereby a sludge is formed.

6. The improvement in the art of treating emulsions of hydrocarbon oils and water which comprises adding thereto a water-soluble low viscosity sulphonated highly aromatic petroleum oil prepared from a sulphur dioxide extract of a highly aromatic mineral oil distillate, which extract has been treated with alkaline material to remove the naphthenic acids.

7. The improvement in the art of treating emulsions of hydrocarbon oils and water which comprises adding thereto a water-soluble sulphonated highly aromatic petroleum oil sludge prepared from a sulphur dioxide extract of a highly aromatic oil which has been treated with alkaline material to remove the naphthenic acids, followed by treating the washed distillate with batches of strong sulphuric acid to form a sludge, and discarding the first batch of sludge.

OLIVER H. DAWSON.